United States Patent Office 3,634,528
Patented Jan. 11, 1972

3,634,528
PROCESS FOR PREPARING 1,5,9-CYCLO-
DODECATRIENES
Jo Itakura, Hisao Tanaka, and Hiroo Ito, Nagoya, Japan, assignors to Toagosei Chemical Industry Co., Ltd., Minato-ku, Tokyo, Japan
No Drawing. Filed Aug. 4, 1969, Ser. No. 847,424
Claims priority, application Japan, Aug. 21, 1968, 43/58,254, 43/59,134, 43/59,135, 43/59,513
Int. Cl. C07c 13/00, 3/10
U.S. Cl. 260—666 B                8 Claims

ABSTRACT OF THE DISCLOSURE 1,5,9-cyclododecatrienes are prepared by subjecting conjugated diolefins to cyclization trimerization in the presence of a catalyst composition obtained by mixing an organic group-containing chlorotitanium compound with an alkylaluminum chloride.

This invention relates to a process for preparing 1,5,9-cyclododecatrienes and substituted 1,5,9-cyclododecatrienes.

The 1,5,9-cyclododecatrienes obtained according to the present process are usable not only as intermediates for nylon-12 but also as starting materials for various useful organic compounds.

An object of the present invention is to provide a process for producing 1,5,9-cyclododecatrienes by the cyclization trimerization of conjugated diolefins, using a catalyst composition for the cyclization trimerization of conjugated diolefins which is high in activity.

Other objects will become apparent from the following description.

The process of the present invention is carried out by trimerizing conjugated diolefins in the presence of a catalyst composition obtained by mixing an organic group-containing chlorotitanium compound with an alkylaluminum chloride. The present process is effective for the cyclization trimerization of not only pure conjugated diolefins but also other olefin- or saturated hydrocarbon-containing conjugated diolefins. According to the present invention, the trimerization of conjugated diolefins can be effected without any substantial formation of solid polymers and while inhibiting the formation of liquid linear polymers to an extremely slight extent. The present invention is further characterized in that the catalyst employed in the present process is, in most cases, soluble in reaction solvent, with the result that the reaction can be effected not only in a homogeneous phase but also in a direction desirable for the formation of trans, trans, cis-1,5,9-cyclododecatrienes due to high stereospecificity of the catalyst.

The organic group-containing chlorotitanium compounds, which are use for preparation of the catalyst compositions employed in the present invention, include α-substituted acetic acid salts, β-diketone complexes, β-keto-aldehyde complexes and β-keto-ester complexes of chlorotitanium. Each of these chlorotitaanium compounds will be explained below.

(i) α-Substituted acetic acid salt of chlorotitanium: This salt is a compound represented by the formula $Cl_nTiY_{4-n}$, wherein Y is an α-substituted acetic acid group, and $n$ is a number of 2 to 3, and is a novel stable compound obtained by reacting titanium tetrachloride with an α-substituted acetic acid.

Heretofore, it has been known that titanium tetrachloride is reacted with acetic acid to form an addition product of titanium tetrachloride and acetic acid, but it has not been known that when a halogen, which is an electron attractive group, is introduced into the α-position of said acetic acid, there is predominantly formed a substitution product which is more stable than the addition product. Moreover, it is quite characteristic that due to the introduction of such a substituent into the α-position of acetic acid, the acetic acid can give more prominent effects when it is combined with an organaluminum compound and is used as a synthesis catalyst for cyclododecatrienes.

Thus, in order to introduce an α-substituted acetic acid group into a titanium compound to obtain an α-substituted acid salt of chlorotitanium, the acid in a free form may be reacted as it is with titanium tetrachloride. If necessary, however, an alkali metal salt of α-substituted acetic acid may be reacted therewith. Preferably substituent for the α-substituted acetic acid is a halogen such as fluorine, chlorine, bromine or iodine. Examples of such α-substituted acetic acid include monochloroacetic acid, dichloroacetic acid, trichloroacetic acid, monobromoacetic acid, dibromoacetic acid, tribromoacetic acid, iodoacetic acid, monofluoroacetic acid, difluoroacetic acid and trifluoroacetic acid.

In case the above-mentioned free α-substituted acetic acid is reacted with titanium tetrachloride, a dehydrochlorination reaction takes place, while in case the above-mentioned acetic acid salt is reacted, potassium or sodium chloride is by-produced, and in each case, the desired acid salt of titanium can be obtained. Even when the by-produced salt is left unremoved, there is brought about no detrimental effect on the synthesis of cyclododecatrienes.

(ii) β-Diketone complex of chlorotitanium: This complex is a compound represented by the formula $Cl_nTi(C_6H_5COCHCOR)_{4-n}$, wherein R is an alkyl or aryl group, and $n$ is a number of 2 to 3, and is a compound stable in air which is obtained by reacting a phenyl group-containing β-diketone with titanium tetrachloride. Examples of the β-diketone include dibenzoylmethane, benzoyl-p-toluylmethane, benzoyl-o-toluylmethane, 4-n-propyl-dibenzoylmethane, 4-ethyl-dibenzoylmethane, 4-isopropyl-dibenzoylmethane, benzoylacetone, ω-propionylacetophenone, ω-butyrylacetophenone, ω-valerylacetophenone and ω-capronylacetophenone.

(iii) β-Keto-aldehyde complex of chlorotitanium: This complex is a compound represented by the formula $Cl_nTi(RCOCR'CHO)_{4-n}$, wherein R is an alkyl or aryl group, R' is a hydrogen atom or an alkyl group, and $n$ is a number of 2 to 3. It is a stable compound capable of being easily obtained by reacting titanium tetrachloride with a β-keto-aldehyde compound or an alkali metal salt thereof, and is a novel complex unknown to the literature. Examples of the β-keto-aldehyde compound, which is a ligand in the above case, include aromatic keto-aldehydes such as benzoylacetaldehyde, p-toluylacetaldehyde, m-toluylacetaldehyde, o - toluylacetaldehyde, α - benzyl - α'-formylacetone, α-methyl-α-benzyl-α'-formylacetone, etc., and aliphatic keto-aldehydes such as acetylacetaldehyde, α-acetylpropionaldehyde, propionylacetaldehyde, butyrylacetaldehyde, valerylacetaldehyde, capronylacetaldehyde, etc.

Most of these compounds are unstable when they are in a free form, but alkali metal salts thereof are stable and can be easily synthesized in favorable yields. When said alkali metal salts are reacted with titanium tetrachloride, inorganic salts such as potassium chloride, sodium chloride, etc. are by-produced and migrate into the resulting titanium compounds. However, these inorganic salts can be removed according to ordinary procedures. Further, even when the titanium compounds are used, as they are, as components of cyclododecatriene synthesis catalysts, without separating said inorganic salts, no detrimental effect is brought about.

(iv) β-Keto-ester complex of chlorotitanium: This complex is a compound represented by the formula $Cl_nTi(RCOCR'CO_2R'')_{4-n}$, wherein R and R'' are individually an alkyl or aryl group, R' is a hydrogen atom or an alkyl group, and n is a number of 2 to 3. This compound can be easily obtained by reacting titanium tetrachloride with a β-keto-ester compound.

Examples of the β-keto-ester, which is a ligand in the above case, include methyl ester of acetoacetic acid, ethyl ester of acetoacetic acid, propyl ester of acetoacetic acid, butyl ester of acetoacetic acid, phenyl ester of acetoacetic acid, methyl ester of α-methylacetoacetic acid, ethyl ester of α-methylacetoacetic acid, methyl ester of α-ethylacetoacetic acid, ethyl ester of α-ethylacetoacetic acid, butyl ester of α-ethylacetoacetic acid, methyl ester of propionylacetic acid, ethyl ester of propionylacetic acid, methyl ester of butyrylacetic acid, ethyl ester of butyrylacetic acid, methyl ester of benzoylacetic acid, ethyl ester of benzoylacetic acid, butyl ester of benzoylacetic acid, amyl ester of benzoylacetic acid, benzyl ester of benzoylacetic acid and β-phenyl ethyl ester of benzoylacetic acid.

The above-mentioned organic group-containing chlorotitanium compounds can be easily obtained in substantially theoretical yields by reacting titanium tetrachloride with corresponding compounds in a nitrogen atmosphere at a relatively low temperature, e.g. below 60° C., in the presence of an aromatic hydrocarbon such as benzene, toluene, xylene, ethylbenzene, propylbenzene or isopropylbenzene; an alicyclic hydrocarbon such as cyclohexane, methylcyclopentane, methylcyclohexane, dimethylcyclohexane or cyclooctane; an aliphatic hydrocarbon such as n-hexane, n-heptane or n-octane; or such a solvent as petroleum ether, petroleum benzine or ligroin.

On the other hand, the alkylaluminum chloride, which is the other catalyst component empolyed in the present invention, is preferably a compound represented by the formula $R_mAlCl_{3-m}$, wherein R is an alkyl group, and m is a number of 1.5 to 2. Generally, there is used an alkylaluminum chloride of the above formula in which R is an alkyl group having about 2 to 6 carbon atoms.

Examples of such alkylaluminum chloride include diethylaluminum chloride, ethylaluminum sesquichloride, dipropylaluminum chloride, propylaluminum sesquichloride, diisopropylaluminum chloride, isopropylaluminum sesquichloride, dibutylaluminum chloride, butylaluminum sesquichloride, etc. Mixtures of these compounds may also be used. Particularly preferably chlorides are diethylaluminum chloride and ethylaluminum sesquichloride. Further, chlorides having an intermediary composition between the two are also useful.

Examples of the reaction solvent include organic solvents inert to the catalyst components, e.g. aliphatic hydrocarbons such as n-hexane, n-heptane and n-octane; aromatic hydrocarbons such as benzene, toluene, xylene, ethylbenzene propylbenzene and isopropylbenzene, aliphatic hydrocarbons such as methylcyclopentane, cyclopentane, dimethylcyclohexane, methylcyclohexane, cyclohexane, cyclooctane, cyclooctene, 1,5-cyclooctadiene, cyclododecene and 1,5,9-cyclododecatriene; and halogenated hydrocarbons such as monochlorobenzene and dichlorobenzene. Among these, however, benzene, toluene, xylene, ethylbenzene, isopropylbenzene, 1,5,9 - cyclododecatrine, 1,5 - cyclooctadiene and chlorobenzenes are frequently used.

The mixing proportions of the organic chlorotitanium compound and the alkylaluminum chloride which are used as catalyst components are preferably such that the amount of aluminum is at least 2 gram-atoms, particularly 10 to 500 gram-atoms, per gram-atom of titanium.

Further, the catalyst concentration is preferably such that the organic chlorotitanium compound is contained in a proportion of 0.01 to 100 mmol. per liter of the reaction mixture. Even at a considerably low catalyst concentration, the trimerization of conjugated diolefins progresses quickly.

The catalyst composition employed in the present invention is desirably prepared in such a manner that the organic chlorotitanium compound and the alkylaluminum chloride are mixed with the solvent in a nitrogen atmosphere and the mixture is aged at 20°–80° C.

In accordance with the present invention, the trimerization of conjugated diolefins can be effected even at atmospheric pressure, and the reaction temperature is within the range of −20° to 150° C., preferably 20° to 80° C.

After completion of the reaction, the residual catalyst is inactivated by use of water or an alcohol, e.g. methanol, ethanol, propanol or butanol. Subsequently, the catalyst residue is removed by washing the solution with a dilute aqueous solution of a mineral acid, e.g. hydrochloric or sulfuric acid, or of an alkali, e.g. caustic soda. Thereafter, the solvent is recovered and then steam distillation or reduced pressure distillation is effected, whereby, in the case of butadiene for example, 1,5,9 - cyclododecatriene is obtained as a main product in a high yield.

The present invention is illustrated below with reference to examples. Examples 1 to 6 show the cases in which a chlorotitanium compound having an α-substituted acetic acid group was used as a component for preparation of the catalyst; Examples 7 to 12 show the cases where a chlorotitanium compound having a phenyl group-containing β-diketone was used; Examples 13 to 19 show the cases in which a chlorotitanium compound containing a β - keto - aldehyde was used; and Examples 20 to 29 show the cases where a chlorotitanium compound containing a β-keto-ester was used.

EXAMPLES 1–2

Preparation of catalyst component

In a nitrogen atmosphere, 0.10 mole of titanium tetrachloride was reacted with 0.20 mole of monochloroacetic acid, using dehydrated benzene as a solvent, whereby a dehydrochlorination reaction took place with generation of heat and a white precipitate was obtained from a red reaction solution. The precipitate was subjected to elementary analysis to obtain the values shown in the table below. Calculated values for $Cl_3Ti(OOCCH_2Cl)$ (molecular weight:247.73) are shown in the parentheses.

|    | Percent        |
|----|----------------|
| Ti | 19.3 (19.4)    |
| C  | 9.01 (9.71)    |
| H  | 0.90 (0.81)    |
| Cl | 57.2 (57.2)    |

From the amount of hydrochloric acid gas generated and from the analysis values, it is considered that the precipitate obtained in the above reaction is a titanium compound of the formula $Cl_3Ti(OOCCH_2Cl)$.

Trimerization of butadiene

In a nitrogen atmosphere, 100 ml. of dehydrated benzene, and ethylaluminum sesquichloride ($Et_3Al_2Cl_3$) and the above-mentioned titanium compound in amounts as set forth in Table 1 were added to a four-necked flask equipped with a stirrer, a gas-injecting pipe and a thermometer, and the mixture was maintained with stirring at 80° C. for 10 minutes. Subsequently, the system was cooled at 35° C. and was allowed to stand for 30 minutes. Into the flask, 54 g. of dry butadiene was injected through the gas-injecting pipe at a rate of 200 ml./min. over a period of about 2 hours, while maintaining the system at 40° C. After the injection, the catalyst was inactivated with 10 ml. of ethyl alcohol, and then reduced pressure distillation was effected to obtain trans, trans, cis-cyclododecatriene (hereinafter referred to as "CDT"). The results were as shown in Table 1.

TABLE I

| Example | Titanium compound | (mmol.) | Et₃Al₂Cl₃ (mmol.) | Ti/Al (gram-atomic ratio) | Butadiene conversion (percent) Value according to gas-chromatography | Butadiene conversion (percent) Value according to distillation | CDT selectivity (percent) Value according to gas-chromatography | CDT selectivity (percent) Value according to distillation |
|---|---|---|---|---|---|---|---|---|
| 1 | Cl₃Ti(OOCCH₂Cl) | 0.055 | 5.50 | 1/200 | 95.6 | 95.6 | 83.5 | 83.5 |
| 2 | Cl₃Ti(OOCCH₂Cl) | 0.037 | 5.50 | 1/300 | 93.3 | 93.2 | 85.3 | 86.0 |

EXAMPLES 3–4

Preparation of catalyst component

The same reaction as in Example 1 was effected, except that the monochloroacetic acid was replaced by trichloroacetic acid, whereby a yellow powder was obtained. The powder was subjected to elementary analysis to obtain the values set forth below. Calculated values for Cl₂Ti(OOCCCl₃)₂ are shown in the parentheses.

Percent
Ti _____ 12.3 (12.9)
C _____ 12.1 (12.9)
Cl _____ 57.1 (57.1)

From the above results and from the amount of hydrochloric acid gas removed, it is considered that the powder is a compound of the formula Cl₂Ti(OOCCCl₃)₂.

Trimerization of butadiene

CDT was synthesized in the same manner as in Examples 1 and 2, except that the above-mentioned compound of the formula Cl₂Ti(OOCCCl₃)₂ was used as the titanium compound, to obtain the results shown in Table 2.

reaction. The precipitate was subjected to elementary analysis to obtain the values set forth below. Calculated values for Cl₃Ti(OOCCHCl₂) (molecular weight:282.18) are shown in the parentheses.

Percent
Ti _____ 16.5 (16.97)
Cl _____ 61.9 (62.81)

From these results, it is considered that a compound of the formula Cl₃Ti(OOCCHCl₂) was formed.

Trimerization of butadiene 0.20 mmol. of the above-mentioned titanium trichlorodichloroacetate as a titanium compound and 2.0 mmol. of diethylaluminum chloride were stirred together in a pressure resistant sealable tube using benzene as a solvent. After aging the mixture, 18.0 g. of purified butadiene was fed to the tube by vacuum distillation. The reaction was effected with stirring at 50° C. for 2 hours to obtain 15.3 g. of CDT. The yield of CDT was 85.1% based on the fed butadiene.

TABLE 2

| Example | Cl₂Ti(OOCCCl₃)₂ (mmol) | Et₃Al₂Cl₃ (mmol.) | Ti/Al (gram-atomic ratio) | Butadiene conversion (percent) Value according to gas-chromatography | Butadiene conversion (percent) Value according to distillation | CDT selectivity (percent) Value according to gas-chromatography | CDT selectivity (percent) Value according to distillation |
|---|---|---|---|---|---|---|---|
| 3 | 0.040 | 4.00 | 1/200 | 93.2 | 92.9 | 87.1 | 86.8 |
| 4 | 0.055 | 5.50 | 1/200 | 95.6 | 95.3 | 89.9 | 89.1 |

EXAMPLE 5

Preparation of catalyst component

In the same manner as in Examples 1 and 2, titanium dichloro-bis-monofluoroacetate was obtained from sodium fluoroacetate. The thus obtained compound was subjected to elementary analysis to obtain the values set forth below. Calculated values for Cl₂Ti(OOCCH₂F)₂ (molecular weight: 272.88) are shown in the parentheses.

Percent
Ti _____ 17.20 (17.55)
Cl _____ 25.35 (25.98)

Trimerization of butadiene

The trimerization of butadiene was effected in the same manner as in Examples 1–2 except that 0.055 mmol. of the above-mentioned titanium dichloro-bis-monofluoroacetate as the titanium compound and 5.50 mmol. of ethylaluminum sesquichloride were used, whereby CDT was obtained at a selectivity of 80.3%. The conversion of butadiene was 93.8%.

EXAMPLE 6

Preparation of catalyst component

In a nitrogen atmosphere, 0.20 mole of titanium tetrachloride was reacted with 0.20 mole of dichloroacetic acid, using dehydrated benzene as a solvent, whereby a pale yellow precipitate was obtained from a red solution, while exhibiting the state of a dehydrochlorination

EXAMPLES 7–11

Preparation of catalyst component (a) In a nitrogen atmopshere, 0.1 mole of titanium tetrachloride was reacted with 0.2 mole of dibenzoylmethane, using dehydrated benzene as a solvent, and the reaction product was heated for a while, whereby a red precipitate stable in air was obtained in a favorable yield. The precipitate was subjected to elementary analysis to obtain the values shown in Table 3. Calculated values for Cl₂Ti(C₆H₅COCHCOC₆H₅)₂ (molecular weight: 533.3) are shown in the parentheses.

(b) In a nitrogen atmosphere, 0.10 mole of titanium tetrachloride was reacted with 0.10 mole of benzoylacetone, using dehydrated glacial acetic acid as a solvent, whereby a red stable precipitate was obtained in a favorable yield. The precipitate was subjected to elementary analysis to obtain the values set forth in Table 3. Calculated values for Cl₃Ti(C₆H₅COCHCOCH₃) (molecular weight: 315.4) are shown in the parentheses.

(c) In a nitrogen atmosphere, 0.10 mole of titanium tetrachloride was reacted with 0.10 mole of ω-propionylacetophenone, using dehydrated benzene as a solvent, whereby a red precipitate was formed. The precipitate was subjected to elementary analysis to obtain the results shown in Table 3. Calculated values for Cl₃Ti(C₆H₅COCHCOC₂H₅)

(molecular weight: 329.5) are shown in the parentheses.

TABLE 3

| Titanium compound | Ti (percent) | ( [(C H $ ](percent percent) | Cl (percen) |
|---|---|---|---|
| (a) | 8.81 (8.98) | 67.4 (67.6) | 4.00 (4.17) | 13.1 (13.3) |
| (b) | 15.0 (15.2) | 38.0 (38.1) | 2.76 (2.88) | 33.6 (33.7) |
| (c) | 13.9 (14.5) | 39.8 (40.1) | 3.01 (3.37) | 32.1 (32.3) |

From the above results, it is understood that the compounds (a), (b) and (c) are of the formulas $Cl_2Ti(C_6H_5COCHCOC_6H_5)_2$, $Cl_3Ti(C_6H_5COCHCOCH_3)$ and $Cl_3Ti(C_6H_5COCHCOC_2H_5)$, respectively.

Trimerization of butadiene

In a nitrogen atmosphere, 10 ml. of dehydrated benzene, and ethylaluminum sesquichloride ($Et_3Al_2Cl_3$) and each of the above-mentioned titanium compounds in amounts set forth in Table 4 were added to a four-necked flask equipped with a stirrer, a gas-injecting pipe and a thermometer, and the mixture was maintained with stirring at 80° C. for 10 minutes. Subsequently, the system was cooled to 35° C. and was allowed to stand for 30 minutes. Into the flask, 54 g. of dry butadiene was injected through the gas-injecting pipe at a rate of 200 ml./min. over a period of about 2 hours, while maintaining the system at 40° C. After the injection, the catalyst was inactivated with 10 ml. of ethyl alcohol, and then reduced pressure distillation was effected to obtain trans, trans, cis-CDT. The results were as shown in Table 4.

chloride from the mixture, the precipitate was subjected to elementary analysis to obtain the values set forth in Table 5. Calculated values for $Cl_2Ti(C_6H_5COCHCHO)_2$ (molecular weight: 413.08) are shown in the parentheses.

(b) The above-mentioned sodium salt of benzoylacetaldehyde and titanium tetrachloride were reacted in a molar ratio of 1:1, using benzene as a solvent, whereby a purple compound could be obtained from the benzene solution portion. The compound was subjected to elementary analysis to obtain the values set forth in Table 5. Calculated values for $Cl_3Ti(C_6H_5COCHCHO)$, (molecular weight: 301.39) are shown in the parentheses.

(c) Benzoylacetaldehyde synthesized according to the above-mentioned method and titanium tetrachloride were reacted in a molar ratio of 2:1, using benzene as a solvent, and the solvent was removed from the solution portion, whereby a deep purple powder was obtained. The powder was subjected to elementary analysis to obtain the values set forth in Table 5. Calculated values for $$Cl_{2.5}Ti(C_6H_5COCHCHO)_{1.5}$$

(apparent molecular weight: 357.24) are shown in the parentheses.

TABLE 5

| Titanium compound | Ti percent | C percent | H percent | Cl percent |
|---|---|---|---|---|
| (a) | 11.2 (11.6) | 51.1 (52.3) | 3.40 (3.41) | 17.1 (17.2) |
| (b) | 15.6 (15.9) | 34.9 (35.9) | 2.21 (2.34) | 35.0 (35.3) |
| (c) | 12.9 (13.4) | 44.2 (45.4) | 2.80 (2.96) | 23.9 (24.8) |

TABLE 4

| | | | | Ti/Al (gram-atomic ratio) | Butadiene conversion (percent) | | CDT selectivity (percent) | |
|---|---|---|---|---|---|---|---|---|
| Example | Titanium compound | (mmol.) | $Et_3Al_2Cl_3$ (mmol.) | | Value according to gas-chromatography | Value according to distillation | Values according to gas-chromatography | Values according to distillation |
| 7 | $Cl_2Ti(C_6H_5COCHCOC_6H_5)_2$ | 0.055 | 5.50 | 1/200 | 95.2 | 95.0 | 84.4 | 84.0 |
| 8 | $Cl_2Ti(C_6H_5COCHCOC_6H_5)_2$ | 0.037 | 3.70 | 1/200 | 89.9 | 90.7 | 69.2 | 69.8 |
| 9 | $Cl_3Ti(C_6H_5COCHCOCH_3)$ | 0.055 | 5.50 | 1/200 | 96.6 | 96.3 | 88.9 | 88.8 |
| 10 | $Cl_3Ti(C_6H_5COCHCOCH_3)$ | 0.037 | 3.70 | 1/200 | 94.2 | 91.7 | 83.3 | 83.1 |
| 11 | $Cl_3Ti(C_6H_5COCHCOC_2H_5)$ | 0.055 | 5.50 | 1/200 | 93.2 | 93.1 | 87.7 | 87.4 |

EXAMPLE 12

In an argon atmosphere, 0.200 mmol. of the titanium compound $Cl_3Ti(C_6H_5COCHCOCH_3)$ synthesized in Example 9 and 1.00 mmol. of diethylaluminum chloride ($Et_2AlCl$) were stirred in a pressure-resistant sealable tube, using 20 ml. of benzene as a solvent, and the mixture was heated and aged at 80° C. The tube was charged according to vacuum distillation method with 20 g. of butadiene and was sealed. The reaction was effected at 60° C. for 2 hours, and the reaction mixture was then subjected to ordinary process to obtain 143 g. of CDT. The selectivity of CDT was 73.1% and the conversion of butadiene was 98.0%.

EXAMPLES 13–15

Preparation of catalyst component (a) Sodium salt of benzoylacetaldehyde synthesized according to the method disclosed in "Bercite," 58, 535 (1925) and titanium tetrachloride were reacted in a molar ratio of 2:1, using benzene as a solvent, whereby a yellow mixture comprising a precipitate of dichloro-bis (β-benzoylvinyloxy) titanium $Cl_2Ti(C_6H_5COCHCHO)_2$ and sodium chloride was obtained. After separating the sodium From the above results, it is considered that the titanium compounds (a), (b) and (c) are of the formulas $Cl_2Ti(C_6H_5COCHCHO_2)$, $Cl_3Ti(C_6H_5COCHCHO)$ and $Cl_{2.5}Ti(C_6H_5COCHCHO)_{1.5}$.

Trimerization of butadiene

In a nitrogen atmosphere, 100 ml. of dehydrated benzene, and ethylaluminum sesquichloride ($Et_3Al_2Cl_3$) and each of the above-mentioned titanium compounds in amounts shown in Table 6 were added to a four-nicked flask equipped with a stirrer, a gas-injecting pipe and a thermometer, and the mixture was maintained with stirring at 80° C. for 10 minutes. Subsequently, the system was cooled to 45° C. and was allowed to stand for 30 minutes. Into the flask, 54 g. of dry butadiene was injected through the gas-injecting pipe at a rate of 200 ml./min. over a period of about 2 hours, while maintaining the system at 50° C. After the injection, the catalyst was inactivated with 10 ml. of ethyl alcohol, and the benzene was removed by reduced pressure distillation. Thereafter, trans, trans, cis-CDT was separated by distillation. The results were as shown in Table 6.

TABLE 6

| | | | | Ti/Al (gram-atomic ratio) | Butadiene conversion (percent) | | CDT selectivity (percent) | |
|---|---|---|---|---|---|---|---|---|
| Example | Titanium compound | (mmol.) | $Et_3Al_2Cl_3$ (mmol.) | | Value according to gas-chromatography | Value according to distillation | Value according to gas-chromatography | Value according to distillation |
| 13 | $Cl_2Ti(C_6H_5COCHCHO)_2$ | 0.055 | 5.50 | 1/200 | 93.0 | 93.0 | 89.1 | 89.0 |
| 14 | $Cl_2Ti(C_6H_5COCHCHO)$ | 0.055 | 5.50 | 1/200 | 97.5 | 95.0 | 80.0 | 79.9 |
| 15 | $Cl_{2.5}Ti(C_6H_5COCHCHO)_{1.5}$ | 0.055 | 5.50 | 1/200 | 100.0 | 97.0 | 86.2 | 85.4 |

EXAMPLES 16-18

Preparation of catalyst component

Sodium salt of acetylacetaldehyde was synthesized according to the method disclosed in "J. Am. Chem. Soc.," 69, 570 (1947) and was reacted with β-keto-aldehyde compounds and titanium tetrachloride to obtain the complexes set forth below.

(a) Titanium tetrachloride and sodium salt of acetylacetaldehyde were reacted in a molar ratio of 1:2, using benzene as a solvent, whereby a brown precipitate was formed. This precipitate was a mixture comprising an acetylaldhyde complex of chlorotitanium and sodium chloride. After separating the sodium salt, the precipitate was subjected to elementary analysis to obtain the results set forth in Table 7. Calculated values for $$Cl_2Ti(CH_3COCHCHO)_2$$

(molecular weight: 288.95) are shown in the parentheses.

(b) Titanium tetrachloride and sodium salt of butyrylacetaldehyde synthesized from methylpropylketone, ethyl formate ester and sodium were reacted in a molar ratio of 1:2, whereby a yellow precipitate was formed. The precipitate was treated in the same manner as in (a) and was then subjected to elementary analysis to obtain the results est forth in Table 7. Calculated vaues for $$Cl_2Ti(C_3H_7COCHCHO)_2$$

(molecular weight: 345.10) are shown in the parentheses.

(c) Titanium tetrachloride and sodium salt of α-acetylpropionaldehyde were reacted in a molar ratio of 1:2, whereby a brown precipitate was formed. The precipitate was treated in the same manner as in (a) and was then subjected to elementary analysis to obtain the results set forth in Table 7. Calculated values for $$Cl_2Ti(CH_3COC(CH_3)CHO)_2$$

(molecular weight: 317.04) are shown in the parentheses.

In the right-most column of the table are described chemical formulas of individual complexes which have been decided from the above-mentioned analytical values.

of butadiene was fed according to vacuum distillation, and reaction was effected with stirring at 60° C. After the reaction, the catalyst was inactivated and the reaction product was subjected to reduced pressure distillation to obtain 15.5 g. of CDT. The selectiviy of CDT was 75.3% and the conversion of fed butadiene was 98.1%.

EXAMPLES 20-27

Preparation of catalyst component (a) In a nitrogen atmosphere, 0.10 mole of titanium tetrachloride was reacted with 0.20 mole of ethyl acetoacetate ester, using dehydrated benzene as a solvent, whereby a red solution was formed while exhibiting the state of dehydrochlorination. The benzene was removed from the solution, whereby an orange powder was obtained. The powder was subjected to elementary analysis to obtain the values shown in Table 9. Calculated values for $Cl_2Ti(CH_3COCHCO_2C_2H_5)_2$ (molecular weight: 377.1) are shown in the parentheses.

(b) In a nitrogen atmosphere, 0.10 mole of titanium tetrachloride was reacted with 0.20 mole of methyl acetoacetate ester, using dehydrated benzene as a solvent, whereby a yellow precipitate was formed while exhibiting the state of dehydrochlorination. The precipitate was subjected to elementary analysis to obtain the results set forth in Table 9. Calculated values for $$Cl_2Ti(CH_3COCHCO_2CH_3)_2$$

(molecular weight: 349.4) are shown in the parentheses.

(c) In a nitrogen atmosphere, 0.05 mole of titanium tetrachloride was reacted with 0.1 mole of ethyl butyrylacetate ester, using dehydrated benzene as a solvent, whereby a pale brown precipitate was obtained while exhibiting the state of dehydrochlorination. The precipitate was subjected to elementary analysis to obtain the results set forth in Table 9. Calculated values for $$Cl_{2.5}Ti(C_3H_7COCHCO_2C_2H_5)_{1.5}$$

(molecular weight: 372.4) are shown in the parentheses.

(d) In a nitrogen atmosphere, 0.10 mole of titanium tetrachloride was reacted with 0.10 mole of ethyl benzoyl-

TABLE 7

| Titanium compound | Ti (percent) | C (percent) | H (percent) | Cl (percent) | Presumable chemical formula |
|---|---|---|---|---|---|
| (a) | 16.3 (16.6) | 32.9 (33.2) | 3.45 (3.49) | 23.9 (24.5) | $Cl_2Ti(CH_3COCHCHO)_2$ |
| (b) | 13.1 (13.9) | 40.1 (41.8) | 5.01 (5.27) | 20.0 (20.5) | $Cl_2Ti(C_3H_7COCHCHO)_2$ |
| (c) | 14.8 (15.1) | 36.1 (37.9) | 4.32 (4.46) | 22.4 (22.4) | $Cl_2Ti(CH_3COC(CH_3)CHO)_2$ |

Trimerization of butadiene

The trimerization of butadiene was effected in the same manner as in Examples 13–15 to obtain the results set forth in Table 8.

acetate ester, using dehydrated benzene as a solvent, whereby a pale orange solution was formed while exhibiting the state of dehydrochlorination. To this solution was added dehydrated petroleum ether, whereby an orange

TABLE 8

| | | | | Butadiene conversion (percent) | | CDT selectivity (Percent) | |
|---|---|---|---|---|---|---|---|
| Example | Titanium compound | (mmol.) | Et$_3$Al$_2$Cl$_3$ (mmol.) | Ti/Al (gram-atomic ratio) | Value according to gas-chromatography | Value according to distillation | Value according to gas-chromatography | Value according to distillation |
| 16 | Cl$_2$Ti(CH$_3$COCHCHO)$_2$ | 0.055 | 5.50 | 1/200 | 96.4 | 96.3 | 92.3 | 92.1 |
| 17 | Cl$_2$Ti(C$_3$H$_7$COCHCHO)$_2$ | 0.037 | 3.70 | 1/200 | 95.1 | 95.0 | 91.2 | 91.0 |
| 18 | Cl$_2$Ti(CH$_3$COC(CH$_3$)CHO)$_2$ | 0.055 | 5.50 | 1/200 | 97.0 | 96.7 | 89.9 | 89.3 |

EXAMPLE 19

In a nitrogen atmosphere, 0.200 mmol. of the dichlorobis(β-benzoylvinyloxy)titanium $Cl_2Ti(C_6H_5COCHCHO)_2$ synthesized in Example 13 and 1.00 mmol. of diethylaluminum chloride were fed together with 30 ml. of dehydrated benzene to a pressure resistant sealable tube, and the mixture was heated and aged with stirring at 80° C. to prepare a catalyst solution. To the tube, 20.0 g.

precipitate was obtained. The precipitate was subjected to elementary analysis to obtain the results set forth in Table 9. Calculated values for $$Cl_3Ti(C_6H_5COCHCO_2C_2H_5)$$

(molecular weight: 345.5) are shown in the parentheses.

(e) In a nitrogen atmosphere, titanium tetrachloride and ethyl α-methylacetoacetate ester were reacted in a molar ratio of 1:2, using dehydrated benzene as a solvent, whereby a yellow powder was obtained. The powder was subjected to elementary analysis to obtain the values set forth in Table 9. Calculated values for $$Cl_2Ti(CH_3COC(CH_3)CO_2C_2H_5)_2$$

(molecular weight: 405.16) are shown in the parentheses.

(f) In a nitrogen atmosphere, titanium tetrachloride and ethyl α-ethylacetoacetate ester were reacted in a molar ratio of 1:2, using dehydrated benzene as a solvent, whereby a yellow powder was obtained. The powder was subjected to elementary analysis to obtain the results set forth in Table 9. Calculated values for $$Cl_2Ti(CH_3COC(C_2H_5)CO_2C_2H_5)_2$$

(molecular weight: 433.22) are shown in the parentheses.

EXAMPLES 28–29

In a nitrogen atmosphere, each of the titanium compounds synthesized in Examples 20 and 24 and diethylaluminum chloride ($Et_2AlCl$) in amounts shown in Table 11 were mixed and reacted in a pressure resistant sealable tube, using 30 ml. of benzene as a solvent, and the mixture is heated to 80° C. After cooling to room temperature, the tube was allowed to stand for a while. To the tube was then fed according to vacuum distillation 20 g. of purified butadiene, and the tube was sealed. The reaction was effected at 40° C. for 2 hours and was then terminated by addition of 2 ml. of ethyl alcohol. After removing the solvent, reduced pressure distillation was effected to obtain CDT. The results of analysis according to gas-chromatography and the like are set forth in Table 11.

TABLE 11

| Example | Titanium compound (mmol.) | $Et_2AlCl$ (mmol.) | Ti/Al (gram-atomic ratio) | Butadiene conversion (percent) | CDT selectivity (percent) |
| --- | --- | --- | --- | --- | --- |
| 28 | $Cl_2Ti(CH_3COCHCO_2C_2H_5)_2$ 0.200 | 1.00 | 1/5 | 96.2 | 77.4 |
| 29 | $Cl_3Ti(C_6H_5COCHCO_2C_2H_5)$ 0.200 | 1.00 | 1/5 | 97.3 | 75.3 |

In the right-most column of the table are described chemical formulas of individual complexes which have been decided from the above-mentioned analytical values.

TABLE 9

| Titanium compound | Ti (percent) | Cl (percent) | Presumable chemical formula |
| --- | --- | --- | --- |
| (a) | 12.5 (12.7) | 18.9 (18.8) | $Cl_2Ti(CH_3COCHCO_2C_2H_5)_2$ |
| (b) | 13.7 (13.7) | 20.1 (20.2) | $Cl_2Ti(CH_3COCHCO_2CH_3)_2$ |
| (c) | 12.6 (12.8) | 23.3 (23.8) | $Cl_{2.5}Ti(C_3H_7COCHCO_2CH_3)_{1.5}$ |
| (d) | 13.4 (13.8) | 30.6 (30.7) | $Cl_3Ti(C_6H_5COCHCO_2C_2H_5)$ |
| (e) | 11.3 (11.8) | 17.4 (17.5) | $Cl_2Ti(CH_3COC(CH_3)CO_2C_2H_5)_2$ |
| (f) | 11.1 (11.1) | 16.1 (16.4) | $Cl_2Ti(CH_3COC(C_2H_5)CO_2C_2H_5)_2$ |

Trimerization of butadiene

In a nitrogen atmosphere, 100 ml. of dehydrated benzene, and ethylenealuminum sesquichloride ($Et_3Al_2Cl_3$) and each of the above-mentioned titanium compounds in amounts as set forth in Table 10 were added to a four-necked flask equipped with a stirrer, a gas-injecting pipe and a thermometer, and the mixture was maintained with stirring at 80° C. for 10 minutes. Subsequently, the system was cooled to 35° C. and was allowed to stand for 30 minutes. Thereafter, 54 g. of dry butadiene was injected through the gas-injecting pipe at a rate of 200 ml./min. over a period of about 2 hours, while maintaining the system at 40° C. After the injection, the catalyst was inactivated with 10 ml. of ethyl alcohol, and the solvent was removed. Thereafter, the reaction mixture was subjected to reduced pressure distillation to obtain trans, trans, cis-CDT. The results were as set forth in Table 10.

While the above has been described in connection with preferred embodiments of this invention, it will be obvious to those skilled in the art that various changes and modifications may be made therein without departing from the invention, and it is aimed, therefore, to cover in the appended claims all such changes and modifications as falling within the true spirit and scope of this invention.

We claim:

1. A process for preparing 1,5,9-cyclododecatrines which comprises contacting 1,3-butadiene at a temperature of from 20° to 80° C. with a catalyst composition obtained by mixing an alkylaluminum chloride with an organic group-containing chlorotitanium compound selected from the group consisting of:

(1) compounds represented by the general formula $$Cl_nTi(RCOCR'CO_2R'')_{4-n}$$

wherein R and R'' are individually an alkyl or aryl group; R' is a hydrogen atom or an alkyl group; and n is a number of 2 to 3, (2) compounds represented by the general formula

TABLE 10

| | | | | Butadiene conversion (percent) | | CDT selectivity (percent) | |
| Example | Titanium compound | (mmol.) | $Et_3Al_2Cl_3$ (mmol.) | Ti/Al (gram-atomic ratio) | Value according to gas-chromatography | Value according to distillation | Value according to gas-chromatography | Value according to distillation |
| --- | --- | --- | --- | --- | --- | --- | --- | --- |
| 20 | $Cl_2Ti(CH_3COCHCO_2C_2H_5)_2$ | 0.055 | 5.50 | 1/200 | 92.9 | 93.7 | 94.5 | 94.4 |
| 21 | $Cl_2Ti(CH_3COCHCO_2C_2H_5)_2$ | 0.037 | 3.70 | 1/200 | 91.8 | 91.5 | 89.8 | 89.2 |
| 22 | $Cl_2Ti(CH_3COCHCO_2CH_3)_2$ | 0.055 | 5.50 | 1/200 | 94.5 | 96.5 | 87.3 | 87.6 |
| 23 | $Cl_{2.5}Ti(C_3H_7COCHCO_2C_2H_5)_{1.5}$ | 0.055 | 5.50 | 1/200 | 90.0 | 89.7 | 81.2 | 81.0 |
| 24 | $Cl_3Ti(C_6H_5COCHCO_2C_2H_5)$ | 0.055 | 5.50 | 1/200 | 05.4 | 95.3 | 90.3 | 90.1 |
| 25 | $Cl_3Ti(C_6H_5COCHCO_2C_2H_5)$ | 0.037 | 3.70 | 1/200 | 92.4 | 92.0 | 88.7 | 88.5 |
| 26 | $Cl_2Ti(CH_3COC(CH_3)CO_2C_2H_5)$ | 0.055 | 5.50 | 1/200 | 90.0 | 89.7 | 83.1 | 83.1 |
| 27 | $Cl_2Ti(CH_3COC(C_2H_5)CO_2C_2H_5)_2$ | 0.055 | 5.50 | 1/200 | 91.1 | 89.9 | 80.2 | 79.9 |

$$Cl_nTi(RCOCR'CHO)_{4-n}$$

wherein R is an alkyl or aryl group; R' is a hydrogen atom or an alkyl group; and $n$ is a number of 2 to 3, (3) compounds represented by the general formula $$Cl_nTi(C_6H_5COCHCOR)_{4-n}$$

wherein R is an alkyl or aryl group; and $n$ is a number of 2 to 3, and (4) compounds represented by the general formula $$Cl_nTiY_{4-n}$$

wherein Y is an α-substituted acetic acid group; and $n$ is a number of 2 to 3, the mixing proportion of the alkylaluminum chloride and the organic group containing chlorotitanium compound being within a range of 2–500 gram-atoms of aluminum per one gram-atom of titanium.

2. A process according to claim 1, wherein the alkylaluminum chloride is a compound represented by the general formula $$R_mAlCl_{3-m}$$

wherein R is an alkyl group; and $m$ is a number of 1.5 to 2.

3. A process according to claim 1, wherein the alkylaluminum chloride is diethylaluminum chloride.

4. A process according to claim 1, wherein the alkylaluminum chloride is ethylaluminum sesquichloride.

5. A process according to claim 1, wherein the organic group-containing chlorotitanium compound is used in an amount of 0.01 to 100 mmol. per liter of the reaction mixture.

6. A process according to claim 1, wherein an aromatic hydrocarbon is used as a reaction solvent.

7. A process according to claim 1, wherein 1,5,9-cyclododecatriene is used as a reaction solvent.

8. A process according to claim 1, wherein 1,5-cyclooctadiene is used as a reaction solvent.

References Cited

UNITED STATES PATENTS 3,280,205  10/1966  Yosida et al. _____ 260—666 B

FOREIGN PATENTS 1,325,966  7/1966  Japan _____ 260—666 B

DELBERT F. GANTZ, Primary Examiner

V. O'KEEFE, Assistant Examiner

UNITED STATES PATENT OFFICE
CERTIFICATE OF CORRECTION

Patent No. 3,634,528　　　　　　　　　　Dated　January 11, 1972

Inventor(s) Jo ITAKURA et al

It is certified that error appears in the above-identified patent and that said Letters Patent are hereby corrected as shown below:

Column 1, lines 8 and 9, the claim for priority should read as follows:

Claims priority, applications Japan, August 17, 1968 58254/68; August 21, 1968 59134/68; 59135/68; August 22, 1968 59513/68.

Signed and sealed this 27th day of June 1972.

(SEAL)
Attest:

EDWARD M. FLETCHER, JR.　　　　　ROBERT GOTTSCHALK
Attesting Officer　　　　　　　　Commissioner of Patents